Nov. 20, 1951
I. A. COLBY
2,575,381
METHOD OF AND APPARATUS FOR CONTINUOUS
WELDING OF PIPES AND TUBES
Filed April 1, 1949
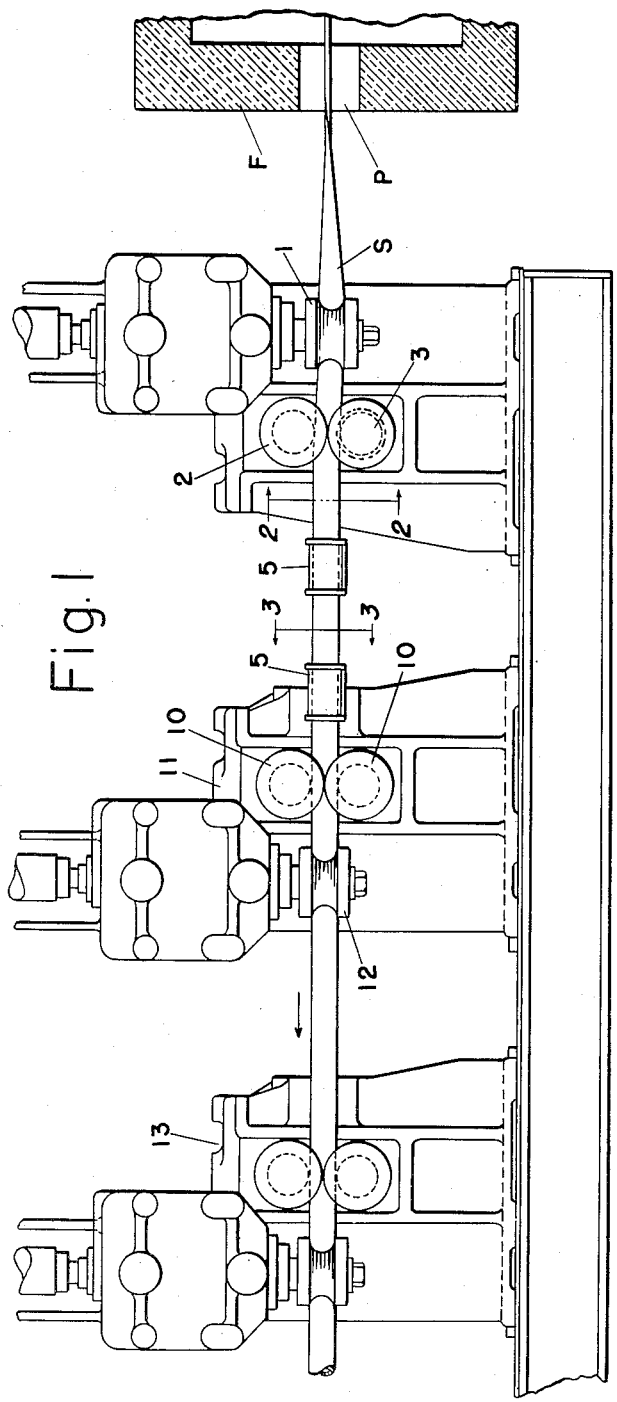
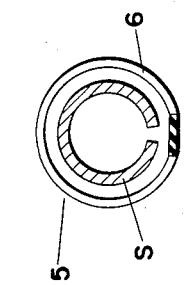
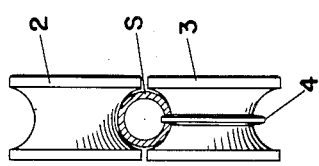
INVENTOR.
IRVING A. COLBY
BY
ATTORNEY Patented Nov. 20, 1951

2,575,381

UNITED STATES PATENT OFFICE 2,575,381

METHOD OF AND APPARATUS FOR CONTINUOUS WELDING OF PIPES AND TUBES

Irving A. Colby, Hubbard, Ohio, assignor to The Youngstown Sheet and Tube Company, Youngstown, Ohio, a corporation of Ohio Application April 1, 1949, Serial No. 84,782

4 Claims. (Cl. 219—6)

This invention relates to the continuous manufacture of pipes and tubes, hereinafter generically termed "pipe," from flat lengths of ferrous metal, generally termed "skelp," which are usually successively welded together one after the other so as to progressively form a continuous strip for conversion into the pipe.

In the present practice of continuous butt weld pipe production the skelp is fed through a furnace in which its temperature is raised close to that required for welding, for example to around 2300° F. where the welding temperature is from 2450° F. to 2500° F., and as the trailing end of the first piece of skelp approaches the rear end of the furnace the leading end of the second piece is welded thereto, so that the furnace is continuously supplied with a continuous strip. As the latter leaves the exit port of the furnace it is progressively formed to a substantially circular cross section, generally through the medium of suitable forming rolls, from which it passes to the welding rolls or other apparatus designed to close the seam and produce the weld, but as its then temperature is insufficient for welding a blast of oxygen is directed against the juxtaposed edges just in front of the welding rolls so as to raise the skelp edges to welding temperature and also to remove any adhering scale from them. From the welding rolls the now welded pipe then passes through a series of reducing or sizing rolls, the arrangement and number of which are largely a matter of choice.

This method is reasonably satisfactory for the continuous production of welded pipe in the smaller sizes and at speeds not exceeding 400' or 500' per minute, but even then is open to certain objections among which may be mentioned the formation of very appreciable amounts of scale as a consequence of the high temperature to which the skelp is heated in the furnace with the result that a relatively large amount of the metal is lost, frequently as much as 3% of the initial weight of the skelp. Moreover, because of the high furnace temperatures required, very high grade and consequently expensive refractories must be used in the construction and maintenance of the furnace and as the major portion of the scale collects in the bottom of the latter it is necessary to periodically shut the furnace down to enable this scale to be cleaned out, thus immobilizing the entire mill for a considerable period, and when oxygen is used the expense of production is enhanced especially since it is impossible to confine the heating closely to the skelp edges, which is all that is in reality required for the welding operation, so that much of the oxygen is wasted in heating more of the skelp than is actually necessary.

Further, when it is attempted to produce pipe in larger sizes or at higher speeds still other difficulties are encountered due to the tendency of the highly heated skelp to collapse inwardly while it is being formed to cylindrical shape since as the diameter of pipe increases the ratio of its wall thickness to its diameter decreases and the said tendency is correspondingly enhanced, while at the higher speeds either unduly high temperatures must be maintained in the furnace or the latter elongated beyond practical limits in order to suitably heat the skelp before its passage to the forming rolls.

The present invention is therefore designed to obviate or minimize the difficulties to which reference has been briefly made and consequently to facilitate the continuous production of welded pipe at high speeds, in sizes larger than is now practicable, and with a maximum of economy.

More specifically, among the objects of the invention are the provision of a novel method and apparatus for the continuous production of pipe which do not require the skelp to be initially so highly heated as to cause the formation of appreciable amounts of scale; which avoids the use of an oxygen or other gaseous blast for heating the juxtaposed edges of the skelp to a welding temperature just prior to welding; which enables very accurate control of the final heating by which the edges of the pipe are brought to welding temperature and which enables this heating to be effected most economically; which reduces the overall cost of production by permitting the heating furnace to be constructed and maintained by the use of relatively low cost refractories as compared with refractories required for high temperature furnaces, and, as a corollary, results in prolongation of furnace life because of the avoidance of such temperatures; and which because of reduced scale formation prolongs the intervals in which the furnace can be kept in operation between periodic shut downs for removal from its bottom of accumulated scale.

A further object is the provision of a method and apparatus of the character aforesaid by means of which more symmetrical pipe can be produced than by present practices by reason of the fact the skelp is formed up at a lower temperature enabling the exertion of greater forming pressure thereon without the danger of its caving in or being thrown slightly out of round.

Other objects, advantages and features of the invention are hereinafter more fully mentioned or will be apparent to those skilled in the art from the following description of the practice of the method thereof by the use of apparatus constructed in accordance therewith, one embodiment of which is illustrated diagrammatically in the accompanying drawing, in which:

Fig. 1 is fragmentary side elevation of the principal mechanical units comprised in said apparatus, the heating furnace being fragmentarily indicated in vertical section.

Fig. 2 is a fragmentary transverse vertical section on the line 2—2 in Fig. 1 but on an enlarged scale showing certain details of forming rolls included in the apparatus; and Fig. 3 is further enlarged detail in vertical section on line 3—3 in Fig. 1 showing a unit employed for bringing the partially formed-up skelp to welding temperature.

Referring more particularly to the drawing, the apparatus illustrated in Fig. 1 comprises a furnace F having a discharge port P from which the skelp S heated by the furnace to a suitable forming temperature, that is, a temperature anywhere from about 1600° F. to about 1900° F., continuously passes to a first stand of forming rolls 1 which are rotatable on vertical axes and suitably driven in any convenient manner to impart to the skelp initial conversion to partially cylindrical form. From these rolls the skelp passes to another pair of forming rolls 2, 3 disposed on horizontal axes adjacent rolls 1 and including an upper roll 2 providing a substantially semicylindrical pass and a complementary lower roll 3 provided with a radially outwardly projecting rib or fin 4 at the center of its pass whereby the spacing of the edges of the skelp S is maintained uniform at substantially the thickness of this rib which is preferably slightly relieved outwardly to facilitate its action. The rib also serves to locate the gap between the edges symmetrically with respect to the vertical plane through the axis of the roll pass, and this spacing of the edges and location of the gap materially contribute to the perfection and uniformity of the subsequently produced weld.

From the second pair of forming rolls 2, 3 the skelp S passes successively through one or a plurality of heating units 5 suitably supported by any convenient means and provided with electrical connections (not shown) whereby a high frequency current of the order of 12,000 cycles per second or higher is passed through a substantially cylindrical conductor 6 inducing intense heating currents in the skelp, particularly adjacent its edges, to thereby rapidly generate sufficient heat to raise the metal to the welding temperature of 2450°–2500° F. Thus either by stages when two or more heating units 5 are employed or at a single heating station when there is only one, the skelp edges are rapidly and progressively heated to welding temperature just prior to passing between a pair of welding rolls 10 disposed on horizontal axes behind the heating station and so formed as to firmly press the now substantially molten edges of the skelp together to insure a uniform and perfect weld. Thereafter the welded pipe may be subjected to the action of a plurality of other sets of rolls, for example reducing rolls 12 mounted on vertical axes in the same stand 11 with welding rolls 10, and any desired number of similar additional stands of rolls of which but one stand, generally designated 13, is shown, the number of such additional stands being entirely a matter of choice. As their effects and mode of operation are well known no illustration or further discussion with regard to them is required.

From what has been said with regard to the processing of the skelp into welded cylindrical form it will be apparent the apparatus described when in operation produces continuously a cylindrical endless pipe so long as skelp is continuously fed into the heating furnace and leading end of each strip is welded to the trailing end of the preceding one in the normal way, unless of course the skelp is fabricated as a continuous strip, and any suitable shear (not shown), positioned beyond the last stand of reducing rolls, may be employed for successively severing the pipe into commercial lengths.

By the employment of induction heating to raise to welding temperature the edges of the preliminarily furnace-heated skelp accurate control of the heat imparted to the edges is afforded while the facility with which such heating may be localized adjacent them maintains heating costs at a minimum; also the welding can be effected without first cleaning the skelp edges since electrical contact between them essential in manufacture of resistance welded pipe is not here required. Moreover, my invention renders it unnecessary to heat the entire width of the skelp to a temperature closely approaching the welding temperature at which it is relatively soft, and the skelp may consequently be subjected to severe forming operations in converting it to final cylindrical form without danger of collapsing it, thus allowing accurately rounded pipe to be produced of the same and even of much larger cross section than heretofore manufactured by continuous operations, while the lower temperature during preheating of the skelp substantially reduces scale production and metal loss and minimizes the necessity, inherent in methods hitherto in vogue, for cleaning out the pre-heating furnace at fairly frequent periodic intervals.

It will therefore be apparent that by the practice of my invention with the aid of novel apparatus such as herein described, which is well adapted for carrying out the method thereof, pipe can be continuously produced in terms of lineal feet at higher speeds than heretofore attainable, larger sizes of pipe can be manufactured than has been feasible by continuous methods and the cost of production per ton of pipe may be materially reduced while the pipe quality is higher on the average and more uniform due to substantial elimination of collapsing or buckling of the hot metal under the working required to perfect its truly circular cross sectional shape. The invention therefore marks a distinct and material advance in the art of continuous welded pipe manufacture.

While I have herein particularly described the method of the invention as carried out with the said apparatus, changes and modifications therein as well as in the apparatus itself will readily occur to those skilled in the art and may be made if desired without departing from the spirit and scope of the invention as defined in the appended claims.

Having thus described my invention, I claim and desire to protect by Letters Patent of the United States:

1. The method of continuously producing welded pipe which comprises passing a continuous strip of skelp progressively through a heating chamber maintained at a temperature sufficient only to raise the skelp to forming temperature, then while the skelp is substantially at that temperature progressively converting it to substantially cylindrical form with its juxtaposed edges in predetermined spaced relation, subjecting the hot formed-up skelp to the action of a high frequency electrical field to raise its said edges at least to welding temperature, and substantially simultaneously therewith forcing said edges together to produce a longitudinally continuous welded seam.

2. The method of continuously producing welded pipe which comprises passing a continuous strip of skelp progressively through a heating chamber maintained at a temperature sufficient only to heat the skelp to a temperature below welding temperature, then while it is substantially at that temperature and after its exit from the chamber progressively converting the skelp to substantially cylindrical form with its juxtaposed edges in predetermined spaced relation, then surrounding the formed and moving skelp with a high frequency electrical field adapted to locally raise the temperature of the metal proximate said edges to welding temperature and after attainment thereof forcing said edges together to produce a longitudinally continuous welded seam.

3. In continuous pipe welding apparatus, the combination of a heating furnace adapted to progressively raise the temperature of a strip of skelp moving therethrough to forming temperature only, means disposed adjacent the exit port of the furnace for converting the skelp to substantially cylindrical form while substantially at said temperature, means disposed adjacent the last mentioned means for generating a high frequency electrical field surrounding the skelp effective to locally raise the edges thereof to welding temperature, and means for thereafter welding the heated edges together.

4. In continuous pipe welding apparatus, the combination of a heating furnace adapted to progressively raise the temperature of a strip of skelp moving therethrough to forming temperature only, means disposed adjacent the exit port of the furnace for converting the skelp to substantially cylindrical form while substantially at said temperature, an induction heating unit adjacent the path of the formed skelp operative to raise the temperature of the juxtaposed edges thereof to welding temperature as they pass the unit, and welding rolls arranged to then receive the skelp and force its heated edges together to form a continuous weld.

IRVING A. COLBY.

REFERENCES CITED

The following references are of record in the file of this patent:

UNITED STATES PATENTS

| Number | Name | Date |
| --- | --- | --- |
| 989,497 | Frick | Apr. 11, 1911 |
| 1,085,639 | Snodgrass | Feb. 3, 1914 |
| 1,093,010 | Ries | Apr. 14, 1914 |
| 2,086,306 | Sessions | July 6, 1937 |
| 2,460,687 | Fuchs | Feb. 1, 1949 |

OTHER REFERENCES

"Blast Furnace and Steel Plant," April, 1930, pages 620 and 621.